United States Patent [19]
Christie

[11] Patent Number: 5,104,528
[45] Date of Patent: Apr. 14, 1992

[54] FLOATING DECANTER

[76] Inventor: Stanley E. Christie, 26291 Turquesa Cir., Mission Viejo, Calif. 92691

[21] Appl. No.: 588,084

[22] Filed: Sep. 24, 1990

[51] Int. Cl.$^5$ ............................................. B01D 21/24
[52] U.S. Cl. ................................. 210/122; 210/242.1; 210/532.1; 210/540
[58] Field of Search ............... 210/121, 122, 104, 540, 210/242.1, 242.3, 532.1

[56] References Cited

U.S. PATENT DOCUMENTS

| | | | |
|---|---|---|---|
| 1,450,545 | 4/1923 | Hans | 210/122 |
| 4,094,338 | 6/1978 | Bower | 210/242.1 |
| 4,581,181 | 4/1986 | Nichols | 210/242.1 |
| 4,601,833 | 7/1986 | Shubert | 210/744 |
| 4,693,821 | 9/1987 | Goronszy et al. | 210/242.1 |
| 4,695,376 | 9/1987 | Astrom et al. | 210/122 |
| 4,867,872 | 9/1989 | Russell et al. | 210/104 |
| 4,891,128 | 1/1990 | Goronszy | 210/121 |
| 4,892,666 | 1/1990 | Paulson | 210/242.3 |
| 4,906,366 | 3/1990 | Moore | 210/242.3 |

FOREIGN PATENT DOCUMENTS 2657488 6/1978 Fed. Rep. of Germany .
2560903 9/1985 France .

OTHER PUBLICATIONS

S. J. Kang, "Sequencing Batch Reactors for Biological Nutrient Removal", Virginia Water Poll. Control Assoc., Mar. 7, 1990.
G. Lewandowski, B. Baltzis, "Biodegradation of Hazardous Wastes Using Sequencing Batch Reactors", N.J. Inst. of Technology, Nov., 1987.

Primary Examiner—Stanley S. Silverman
Assistant Examiner—Christopher Upton
Attorney, Agent, or Firm—Walter A. Hackler

[57] ABSTRACT

The floating decanter apparatus of decanting supernatant from a vessel or basin without drawing floating solids or scum includes a weir for decanting supernatant from the basin and a float for buoyantly supporting the weir in the basin. An actuator is provided for moving the weir, relative to the float, from a first position at which a discharge opening of the weir is above the surface level of the supernatant in the basin, to a second position at which the discharge opening is below the surface level, thereby enabling the supernatant to enter the weir from below the surface. Solids are prevented from entering the discharge opening before and during decanting of the supernatant and means are provided for removing the supernatant to a location outside the basin.

6 Claims, 3 Drawing Sheets

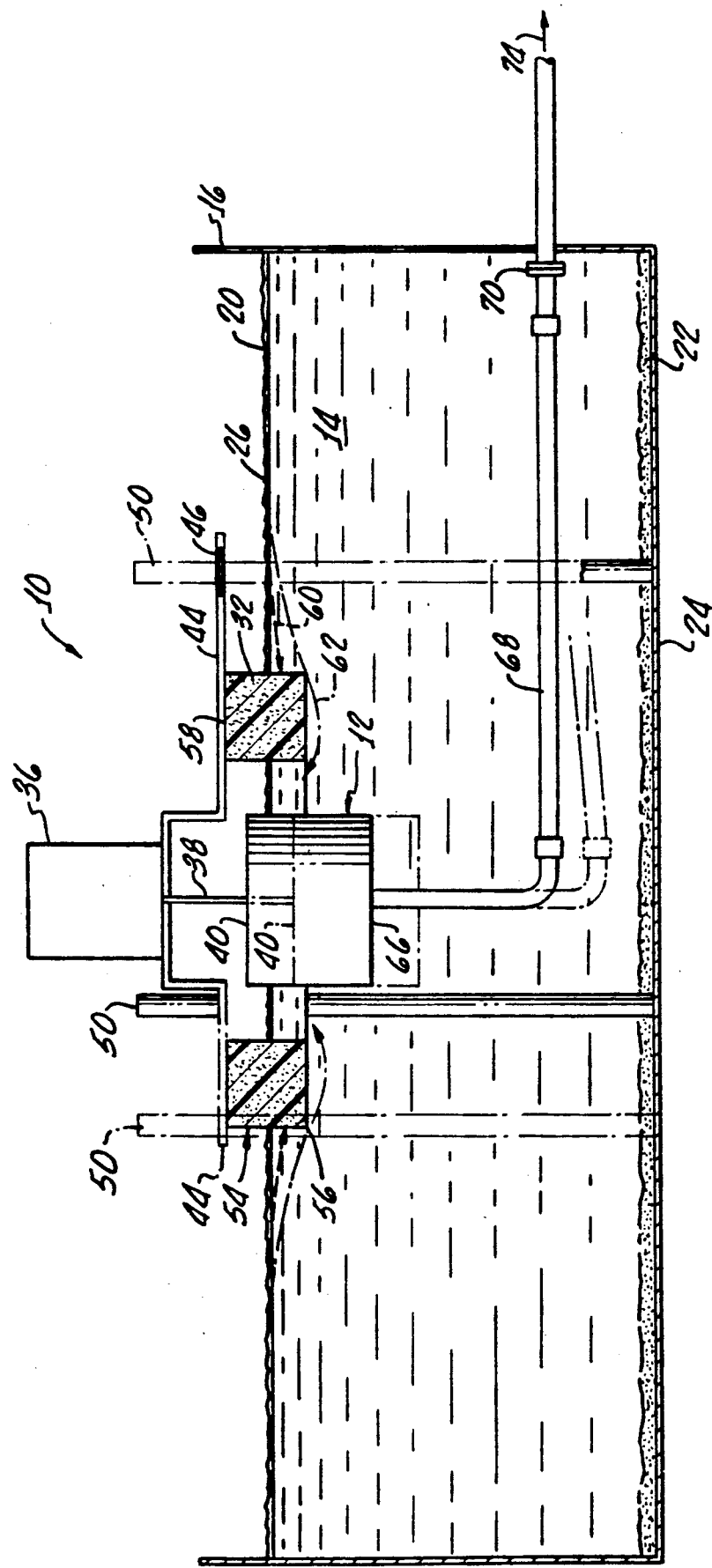

FLOATING DECANTER

The present invention relates to decanting apparatus for the withdrawal of supernatant from a reactor without drawing floating solids or scum during decanting mode while preventing the accumulation of suspended solids in the decanter receptacle during non-decanting modes. It is particularly useful in a biological wastewater treatment such as a Sequencing Batch Reactor (SBR), an aerobic digester, or the like. In a typical SBR, a reactor or basin, is operated in a sequential manner which includes a fill phase, a react phase, a settle phase, and a decant phase.

A number of decanting systems have been developed to withdraw supernatant from the basin following the settle phase. These devices can generally be classified as a fixed type decanter or a floating type decanter. The object of these devices is to withdraw the supernatant without withdrawing floating solids or scum during the decant sequence. Equally important is that the suspended solids are prevented from entering the decanter receptacle during non-decant sequences.

An example of a floating type decanter is disclosed in U.S. Pat. No. 4,695,376. This floating decanter attempts to prevent floating solids or scum from entering the stream of decanted supernatant via a float. During non-decant sequences, the weir is held against the underside of the float (in a submerged position) in a sealed arrangement for preventing suspended solids from entering the weir.

After the settle phase, a linear actuator is utilized to lower the weir from the underside of the float thereby enabling the weir to decant the supernatant.

Unfortunately, during the fill, react, and settle phases suspended solids enters and accumulates in the decanter receptacle due to inability of the sealing arrangement to provide an absolute seal. Consequently, during the initial decanting operation, a higher solids content is evident in the decanted supernatant. In many instances, this solids content is sufficiently high to necessitate a flush system that recirculates the first several minutes of decant fluid. This flushes the lines of solids settled in the decanter during non-decant sequences, but does not ensure effluent suspended solids consistent with the quality of the clarified supernatant. This problem was documented in a paper for the Hazardous Substance Management Research Center, New Jersey Institute of Technology entitled "Biodegradation of Hazardous Wastes Using Sequencing Batch Reactors" published in November of 1987.

The present invention overcomes the hereinabove recited deficiencies of prior art devices and provide a superior floating decanter which is able to deliver the supernatant without initial contamination with solids.

SUMMARY OF THE INVENTION

The decanter apparatus, in accordance with the present invention, for decanting supernatant from a vessel or basin without drawing floating solids or scum, includes weir means for decanting supernatant from a basin and float means for buoyantly supporting the weir means in the basin.

Actuator means are provided for moving the weir means, relative to the float means, from a first position at which the discharge opening of the weir means is above a fluid surface level, to a second position at which discharge opening is below the surface level thereby enabling supernatant to enter the weir means from below the surface level. This structure has the advantages of supporting the weir in a position out of the liquid operation of the basin during non-decant sequences namely fill, react and settle phases.

Because the top of the weir is above the liquid surface level, there can be no contamination thereof of solids during the fill, react and settle phases. No sealing is necessary as in prior art devices since the weir is held above the liquid surface level. Thus, the weir top or entrance, over which supernatant will subsequently pass is never exposed to suspended or floating solids and when decanting is initiated, when the weir is in the second position below the surface level, there is no surge or increase in particulates or solids, in the supernatant, as experienced in prior art devices.

More particularly, in accordance with the present invention, the means for preventing floating debris from entering the discharge opening comprises means defining a donut-shape for the float means and the actuator means supports the weir within the central opening of the donut-shape float means. Further, the float means comprises means defining a buoyancy thereof in order that side walls thereof extend above a level of the discharge opening when the discharge opening is at the first position and below a level of the discharge opening when the discharge opening is in the second position. Thus, it can be seen that this structure operates as a barrier to floating solids or scum when the weir is in the first position during the fill and react and settle phases and at its second position during the decant phase, the side walls of the donut-shape float means preventing entry of circulated surface solids directed toward the weir during decanting of supernatant. While the side walls may not totally prevent the downward circulation of solids during the decant phase, such circulation is reduced and, further, any solids drawn from the surface impinge the float side walls and cling thereto, thereby providing a positive barrier for the weir during the decant phase.

In another embodiment of the present invention, the means for preventing floating debris from entering the discharge opening includes a baffle attached to and surrounding the discharge opening which includes a generally vertical disposed member extending above and below a top of the discharge opening. The top of the baffle extends above the surface level of the liquid when the weir means is at the second position. The baffle includes a generally horizontal member interconnecting the generally vertical member for causing supernatant to pass under the bottom of the vertical means into the said weir means when the weir means is at the second position. In this embodiment, the float means includes a plurality of spaced apart floats which may include the means, defining an exterior shape thereof, for minimizing 90 degree impingement of supernatant moving in a direction toward the weir as the supernatant is removed from the weir to a location outside the water basin.

More particularly this embodiment ma include float means which includes the three separate floats, each having an ovate shape.

BRIEF DESCRIPTION OF THE DRAWINGS

A better understanding of the present invention ma be had from consideration of the following detailed description, taken in conjunction with the accompanying drawings in which:

FIG. 2 is a cross-section view of the apparatus shown in FIG. 1 showing the discharge weir in its two positions;

DETAILED DESCRIPTION

Figure 1:
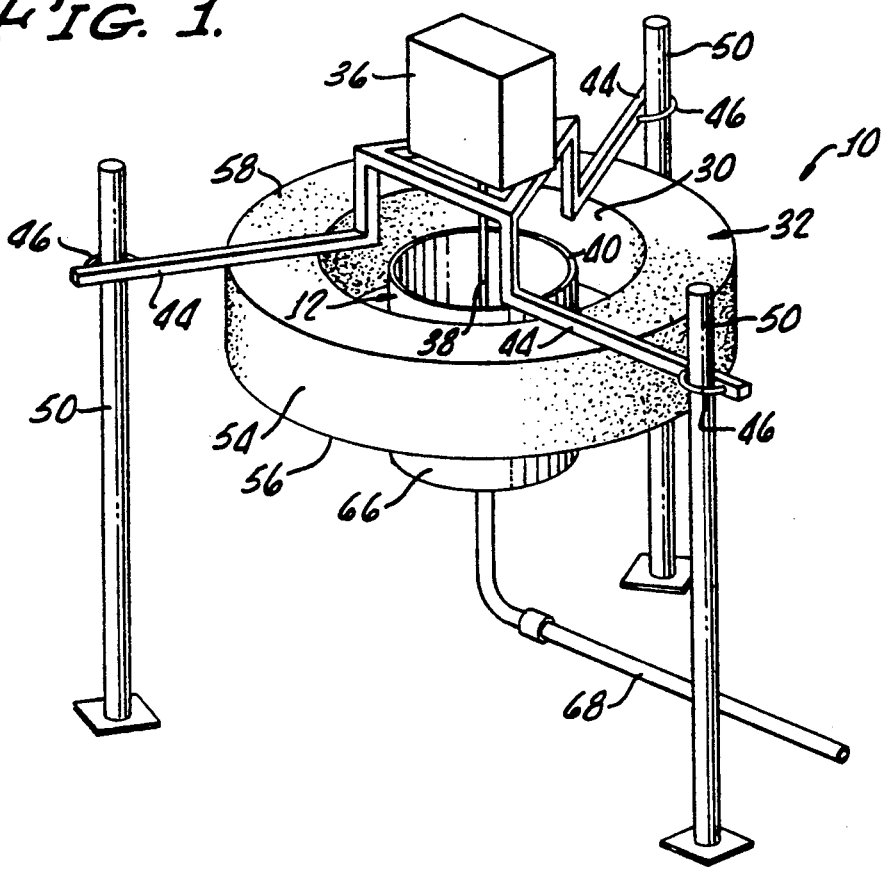
FIG. 1 is a perspective view of one embodiment of the present invention generally showing a donut-shaped float for supporting a weir means in a central position and actuator means interconnected with the means and the float means for lowering the weir from a position above the surface of liquid in a basin to the second position below the surface level, with the donut-shaped float providing means for preventing floating debris from entering the discharge opening when the discharge opening of the weir is at the second position below the surface level.

Turning now to FIG. 1, there is shown a floating decanter apparatus 10 which generally includes a movable discharge weir 12 which provides means for decanting supernatant 14 from a basin 16 (See FIG. 2) without drawing floating solids or scum 20. As shown in FIG. 2, the floating decanter apparatus 10 is disposed in a vessel 16 or sequencing batch reactor (SBR), the latter being shown in the settle phase at which the majority of solids 22 have accumulated at the bottom 24 of the basin 16, leaving the supernatant 14 along with a certain amount of floating solids and scum 20 on or near the surface 26 of the supernatant 14.

As hereinabove described, the sequencing batch reactor is first filled with a liquid having suspended solids 22 therein and, after the mix and react phase, the suspended solids are allowed to settle to the bottom 24 of the vessel 16. The process steps which include the filling of the reactor 16, the react phase and the settle phase are not part of the present invention.

The discharge weir 12 is disposed at a central portion 30 of a donut-shaped float 32 by means of a linear actuator, 36 interconnected with the weir by a shaft 38. The linear actuator 36 may be of any conventional type interconnected in any suitable manner to the discharge weir 12 for moving the discharge weir 12 to and from a first position, shown in FIG. 2, at which a discharge opening of 40 is above the surface 26 to a second position, shown in broken line in FIG. 2, in which the discharge opening (40) is below the surface 26.

The linear actuator 36 is interconnected with the float 32 by means of arms 44. Such interconnection may be conventional in nature and any number of arms may be utilized. Preferably, the arms 44 include guides 46 to enable sliding vertical movement along posts 50 in order that the float 32 allows the weir actuator to maintain the relative positions with the surface 26 shown in FIG. 2. The float can be made of fiberglass or stainless steel material and filled with a polyurethane foam which provides a buoyancy so that when the linear actuator 36 lowers the weir 12 to the second position at which discharge opening 40 is below the surface 26, the exterior vertical surface 54 extends to a point 56 below the level of the discharge opening 40 when the discharge weir is in the second position as shown in broken line in FIG. 2.

It should be appreciated that the discharge opening 40 is expected to be in a position approximately 12 to 24 inches below the surface 26 during decanting of supernatant 14 from the vessel 16. Accordingly, the float is sized and constructed from materials well known in the art in order that the vertical surface 54 of the donut-shaped float 32 extends to a point 58 above the discharge opening 40 when it is in the first position and to the point 56 lower than the discharge opening 40 when in the second position.

Hence, because the discharge opening is raised above the surface level during the fill, react and settle phases, no particulate solids suspended therein has any contact with the discharge opening 40. Further, after the solids have settled, leaving the supernatant 14 with solids 20 floating on the surface 26, and the discharge weir 12 is lowered by the linear actuator 36 to the second position, as shown in broken line in FIG. 2, the donut-shaped float still provides a barrier for any floating solids or scum 20 which may be circulated toward the float as designated by the dotted arrow 60 during decanting or removing of supernatant 14 as indicated by the flow arrow 62.

The bottom 66 of the weir 12 is interconnected by means of a flexible conduit 68 and fitting 70 which provides means for removing the supernatant entering the discharge weir 12 to a location 74 outside the basin 16.

Figure 3:
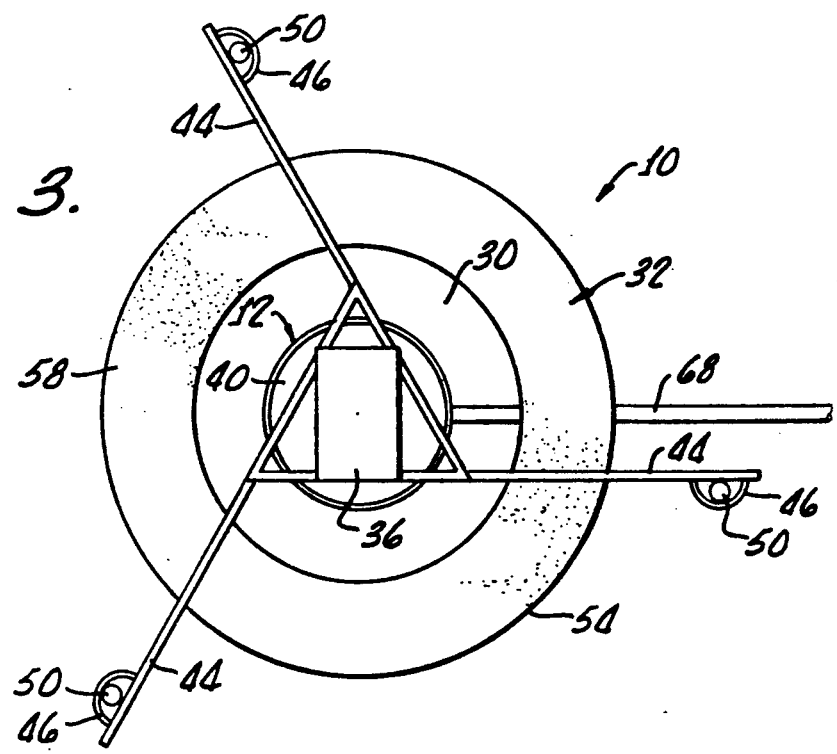
FIG. 3 is a top view of the embodiment shown in FIG. 1.
Figure 4:
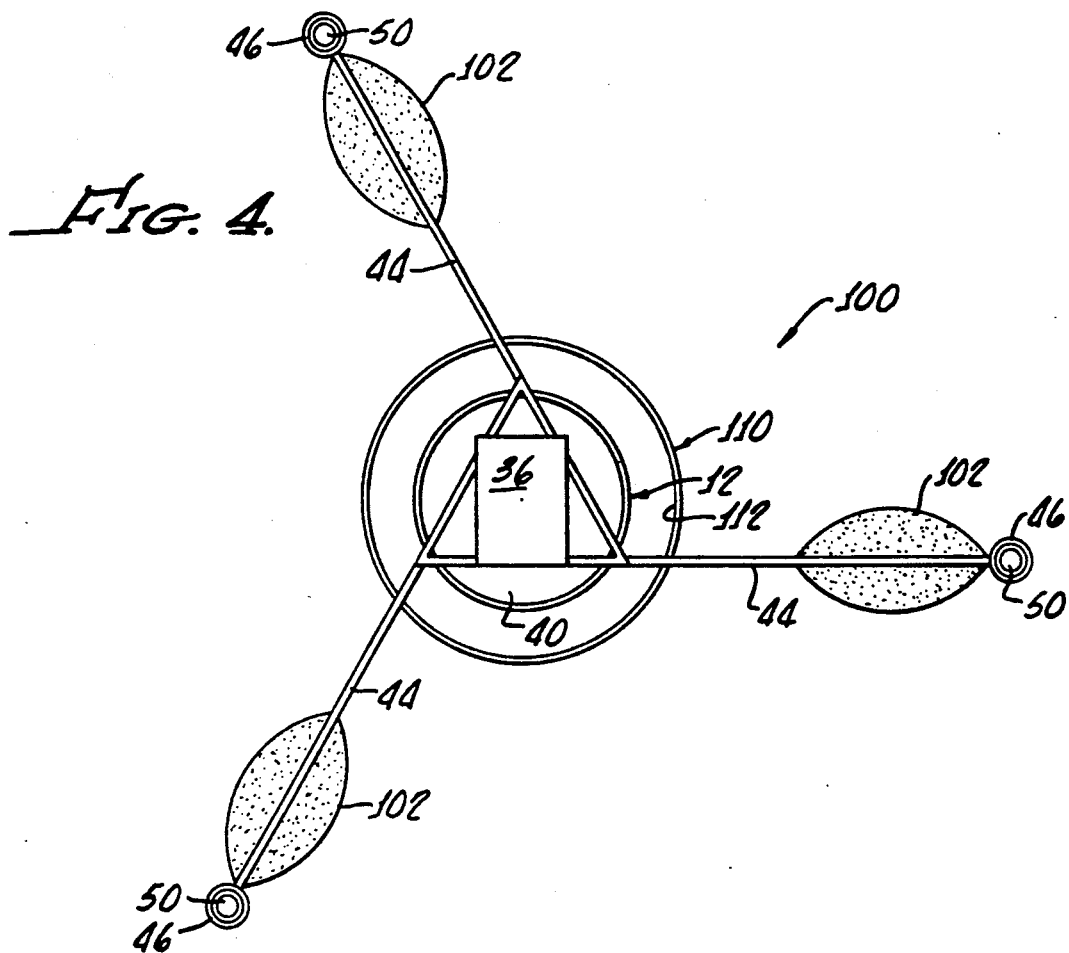
FIG. 4 is an alternative embodiment of the present invention which includes three separate floats and a baffle arrangement for preventing floating debris from entering the discharge opening during the decanting of supernatant.
Figure 5:
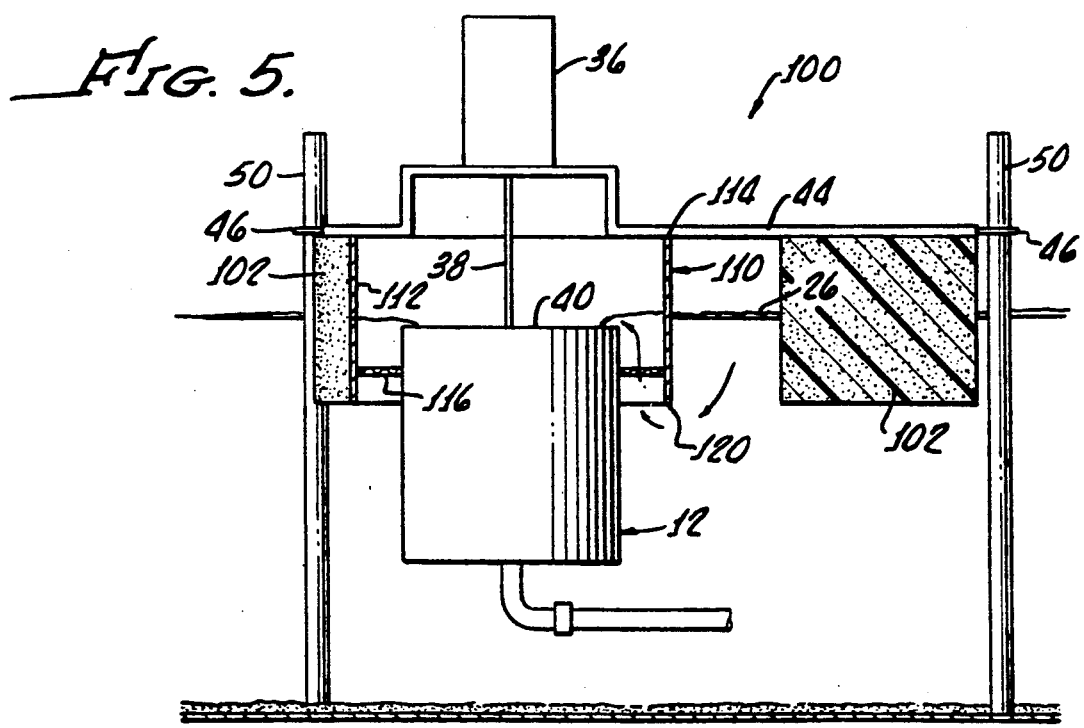
FIG. 5 is a cross section side view of the embodiment of FIG. 4 showing the weir in its second position for decanting supernatant.

An alternative embodiment 100 of the present invention is shown in FIGS. 4 and 5, similar structural items having the same character reference as the embodiment 10 as shown in FIGS. 1-3. As shown in FIGS. 1-3, a discharge weir 12 is provided having a discharge opening 40 which is raised above and below the surface 26 of the supernatant by a linear actuator 36 and connecting rod 38.

In the embodiment of FIG. 4, however, three separate floats 102 are provided arms 44 and guides 46 and posts 50 in the above flotation of the decanting apparatus 100 in the supernatant 14. In this embodiment 100, the discharge weir is surrounded by a baffle 110 which provides means for preventing floating debris from entering the discharge opening 40 during the decanting operation.

As shown in cross-section in FIG. 5, the baffle 110 includes a vertically disposed member 12 extending above and below the discharge opening 40, with a top 114 of the baffle 110 extending above the surface level 26 when the weir 12 is at the second position, as shown in FIG. 5.

Although typically not required, a filter 116 may be horizontally disposed between the baffle 110 and the weir 12 to provide additional means for preventing floating debris from entering the discharge opening 40 which may pass under the bottom 120 of the baffle 110 when the weir is at this position.

In order to prevent a buildup of floating solids 20 on to the floats 102 during natural migration toward the decanting apparatus 112 during the decanting phase, the floats may have an ovate shape, thereby minimizing 90 degree impingement of surface solids moving at a direction toward the weir 12 as supernatant is pumped from the weir 12 to a location 74 outside the basin 16.

Although there has been described hereinabove a specific floating decanter, in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. Floating decanter apparatus for decanting supernatant from a vessel or basin without drawing floating solids or scum, said apparatus comprising:

weir means for decanting supernatant from a basin;

a plurality of spaced apart floats for buoyantly supporting said weir means in said basin;

actuator means connected to said weir means for moving said weir means, relative to said float means, from a first position at which a discharge opening of said weir means is above the surface level of the supernatant in said basin, to a second position at which the discharge opening is below the surface level enabling supernatant to enter said weir means, from below said surface level;

flow diverting means for preventing floating debris from entering said discharge opening when said discharge opening is at said second position, and for causing subsurface decanting of the supernatant comprising a baffle attached to and surrounding said discharge opening and having a generally vertically disposed member extending above and below the discharge opening, the bottom of said baffle extending below the surface level of the liquid when the weir means is at the second position, said baffle including a plurality of generally horizontal members interconnecting said generally vertical member, said activator means, and said plurality of spaced apart floats;

means for removing supernatant entering said weir means to a location outside said basin; and guide means for holding said floating decanter apparatus in said vessel or basin without significantly affecting the buoyancy thereof.

2. The floating decanter apparatus according to claim 1 wherein said floats include means, defining an exterior shape thereof for minimizing 90 degree impingement of surface solids moving in a direction toward said weir as supernatant is removed from said weir to a location outside said basin.

3. The floating decanter apparatus according to claim 2 wherein said float means comprises three floats each having an ovate shape.

4. Floating decanter apparatus comprising:

weir means for decanting supernatant from a wastewater basin;

a plurality of spaced apart floats for buoyantly supporting said weir means in said waste water basin in a continuous manner from an initial period when suspended solids are present throughout a liquid disposed in said waste water basin, including at and near a surface level of said liquid, to a final period when most of the solids have settled to the bottom of the basin leaving a supernatant with a small amount of solids floating thereon;

actuator means connected to said weir means for moving said weir means, relative to said float means, from a first position at which a discharge opening of said weir means is above said surface level of said liquid to a second position at which the discharge opening is below the surface level, enabling supernatant to enter said weir means from below said surface level;

flow diverting means for preventing suspended solids at and near said surface level from impinging or entering said discharge opening when said discharge opening is at both said first and second positions and for causing subsurface decanting of supernatant comprising a baffle attached to and surrounding said discharge opening and having a generally vertically disposed member extending above and below the discharge opening, the bottom of said baffle extending below the surface level of the liquid when the weir means is at the second position, said baffle including a plurality of generally horizontal members interconnecting said generally vertical member, said activator means, and said plurality of spaced apart floats;

means for removing supernatant entering said weir means to a location outside said waste water basin; and guide means for holding said floating decanter apparatus in said vessel or basin without significantly affecting the buoyancy thereof.

5. The floating decanter apparatus according to claim 4 wherein said floats include means defining an exterior shape thereof for minimizing 90 degree impingement of supernatant moving in a direction toward said weir as supernatant is removed from said weir to a location outside the waste water basin.

6. The floating decanter apparatus according to claim 5 wherein said float means comprises three floats each having an ovate shape.

* * * * *